United States Patent [19]
Wilkinson

[11] Patent Number: 6,125,140
[45] Date of Patent: Sep. 26, 2000

[54] PROCESSING ENCODED SIGNALS

[75] Inventor: James Hedley Wilkinson, Tadley, United Kingdom

[73] Assignees: Sony Corporation, Tokyo, Japan; Sony United Kingdom Limited, Weybridge, United Kingdom

[21] Appl. No.: 08/944,600

[22] Filed: Oct. 6, 1997

[30] Foreign Application Priority Data

Oct. 9, 1996 [GB] United Kingdom .................... 9621067
Jul. 28, 1997 [GB] United Kingdom .................... 9715916

[51] Int. Cl.[7] ................................ H04N 7/12; H04B 1/66
[52] U.S. Cl. ......................... 375/240; 348/403; 348/409; 348/699; 382/232; 382/238
[58] Field of Search ..................................... 348/384, 390, 348/403–410, 423, 441, 426, 699, 415; 382/232–236; 364/514 R; 380/15; 375/240; H04N 7/12; H04B 1/66

[56] References Cited

U.S. PATENT DOCUMENTS

| | | | |
|---|---|---|---|
| 4,654,704 | 3/1987 | Lipel | 380/15 |
| 5,321,440 | 6/1994 | Yanagihara et al. | 348/408 |
| 5,623,424 | 4/1997 | Azadegan et al. | 364/514 R |
| 5,684,714 | 11/1997 | Yogeshwar et al. | 364/514 R |
| 5,742,347 | 4/1998 | Kandlur et al. | 348/426 |
| 5,796,434 | 8/1998 | Lempel | 348/403 |
| 5,831,688 | 11/1998 | Yamada et al. | 348/699 |
| 5,847,762 | 12/1998 | Canfield et al. | 348/415 |

FOREIGN PATENT DOCUMENTS

509576 A2 10/1992 European Pat. Off. .
656 729 A2 6/1995 European Pat. Off. .

*Primary Examiner*—Howard Britton
*Assistant Examiner*—Tung Vo
*Attorney, Agent, or Firm*—Frommer Lawrence & Haug, LLP; William S. Frommer

[57] ABSTRACT

A frame of time-domain video signals Si is supplied via a frame reorderer (40) to a motion vector estimator (41), and then to a DCT transformer (43) and a quantizer (44) to produce a quantized, transformed current frame $S^T i/q$. A subtracter (42) subtracts a transformed quantized prediction frame $S^T p/q$ from $S^T i/q$ to produce an inter-encoded signal $\Delta$. The prediction frame $S^T p/q$ is produced by adding the prediction signal to $S^T p/q$ to the inter-encoded signal $\Delta$, dequantizing (46) and inverse transforming (47) the sum and applying the sum to a motion compensation circuit (49) to produce a time domain prediction signal Sp which is transformed (50) and quantized (51) to produce $S^T p/q$ The quantizers (44) and (51) are controlled by the same quantization level Qv. The encoder and a corresponding decoder allow frames to be encoded and decoded with reduced reconstruction errors in systems where compress ion codecs are cascaded.

32 Claims, 7 Drawing Sheets

PROCESSING ENCODED SIGNALS

BACKGROUND OF THE INVENTION

1. Field of the Invention

The present invention relates to the processing of encoded signals.

2. Description of the Prior Art

It is known to digitally encode signals according to the MPEG 2 standard defined in ISO/IEC 13818-2. A signal encoded according to MPEG 2 comprises I-frames and P and/or B-frames. I-frames or intra-encoded frames are frames in which all the information necessary to decode the frame is preserved within the frame. P and B-frames are inter-encoded frames. P and B-frames contain motion-compensated differences between two-frames. In practice the difference is between a frame and a prediction derived from one or two other frames. The differences are ultimately referenced to one or two I-frames. P-frames are predicted from a single preceding reference frame which may be an I-frame or a P-frame. B-frames are bidirectionally interpolated from the nearest preceding I or P frame and the nearest succeeding I or P frame. The encoded frames are organised into a Group of Pictures or GOP of which at least one frame is an I-frame, and which may include one or more B and/or P frames.

FIG. 10A is a block diagram of a typical MPEG 2 signal encoder. The operation of such an encoder is well known and therefore will be described only briefly herein.

The compressor of FIG. 10A comprises a frame re-orderer 80, a motion vector estimator 81, a motion compensator 89, a subtracter 82, an adder 88, a DCT transform unit 85, a quantizer 84, an entropy encoder 85, an inverse quantizer 86 and an inverse DCT unit 87.

As is known in MPEG, blocks of transformed data are organised into macroblocks and the macroblocks are assembled into slices and slices into pictures. There are three types of picture, I, B and P described above.

The frame reorderer 80 receives input video data and acts on successive groups of pictures (GOP) to reorder the pictures so that each picture within the GOP is compressed after those pictures on which it depends. For example, if a B-picture (bi-directionally predicted picture) depends on a following I- or P- picture, it is reordered to be compressed after that I- or P- picture.

For example, if a GOP comprises the following four initial frames (in the order in which they are displayed), $I_0 B_1 B_2 P_3 \ldots$, where the P-picture uses the I-picture as a reference and the two B- pictures use the surrounding I- and P-pictures as references, then the frame reorderer 80 will reorder the GOP to be compressed in the following order: $I_0 P_3 B_1 B_2 \ldots$. The pictures are also transmitted to the decoder for decoding in that order $I_0 P_3 B_1 B_2 \ldots$.

I- pictures are intra-picture encoded, that is to say the encoding is not based on any other reference pictures. An I-picture in a GOP is therefore passed from the frame reorderer 80 to the DCT transform unit 85, the quantizer 84 and the entropy encoder 85 to generate output compressed data representing that I- picture.

The compressed I-picture data is also passed from the quantizer 84 through a decompression chain formed by the inverse quantizer 86, and the inverse DCT transform unit 87. This reconstructs a version of the I- picture present in the decoder which is passed to the motion predictor 540.

The next picture of the GOP to be compressed, which will generally be a P-picture which depends on the I- picture as a reference, is passed from the frame reorderer 80 to the motion vector estimator 81 which generates motion vectors indicative of image motion between the I- and P- pictures. The motion compensator 89 then generates a predicted version of the P picture using the motion vectors and the decoded version of the I- picture. This predicted version of the P- picture is subtracted from the actual P- picture by the subtracter 82 and the difference between the two frames is passed to the DCT transform unit 85 and the quantizer 84 and the coder 85 for compression. As before, the encoded (compressed) difference data is output by the quantizer 85 and is then decoded by the decompression chain 86, 87 to regenerate a version of the difference data.

In the adder 88 the difference data is then added to the previously decompressed version of the I- picture to generate a decompressed version of the P-picture which is then stored in the motion predictor 89 for use in the compression of the next picture.

This process continues, so that each picture which uses other pictures as a reference is in fact compressed by encoding difference data between the input picture and a predicted version of the input picture formed by motion prediction from a previously compressed and then decompressed version of the reference picture. By using a predicted picture derived by decompressing and dequantizing, reconstruction errors are reduced in the finally displayed image. This is because the difference data is then the "error" between the input picture and the picture data which will be available at the decompressor to be added to the error to reconstruct the input picture.

Information identifying the type of picture I, B, P and information relating to quantization levels and motion vectors is conveyed as syntax data in headers associated with e.g. the macro blocks.

The corresponding decoder is shown in FIG. 10B from which it is apparent the predicted picture Sp is added to the decoded difference data Δ in the time domain to produce the decoded picture Si.

If the same video signal is MPEG encoded, and decoded more than once, and if the data rate (quantization level) changes between generations errors in the reconstructed signal (i.e. the differences between the original video signal and the signal produced following one or more generations of encoding and decoding) increases with each generation.

Such encoding decoding and re-encoding and decoding over several generations may occur in for example editing systems using different encoded data rates at each generation. Such encoded signals are decoded to the time domain for frame accurate editing and then re-encoded. Such repeated, decoding and re-encoding may occur also in other circumstances.

British Patent Application 9621067.9 filed Oct. 9, 1996 (Attorney reference: I-96-1; P/749.GB; S96P5032GB00) proposes a method of processing digitally encoded signals comprising intra-encoded frames and inter-encoded frames, the inter-encoded frames having associated therewith respective quantization levels and respective motion vectors, the method comprising converting the inter-encoded frames to intra-encoded frames retaining unchanged the respective quantization levels. It has been found that, by retaining, unchanged, the respective quantization levels, the reconstruction error of intra-encoded frames is very small over many generations of decoding and re-encoding. This is shown in accompanying FIG. 8 where Yo and Co indicate the luminance and chrominance reconstruction errors for I-frames. Although there is some increase in error over many generations it is small. The figure is based on using codec 'A' which encodes and decodes I-B 2-frame GOP followed by a codec 'B' which encodes and decodes a single frame GOP (I-frame only). The results in FIG. 8 show the effects of cascading through a succession of A, B codecs thus: A, B, A, B, A etc. In FIG. 8, lines $Y_1$ and $C_1$ indicate error for B frames. As shown by $Y_1$ and $C_1$ the error increases using the B codec but then recovers to close to the first generation performance when followed by a third generation of codec 'A'.

FIG. 8 indicates the reconstruction error as signal to noise ratio (dB), decreasing signal to noise ratio indicating increasing reconstruction error.

The present invention seeks to provide signal encoder said decoders which allow a reduction in reconstruction error when signals are repeatedly encoded and decoded.

SUMMARY OF THE INVENTION

According to one aspect of the present invention there is provided a method of and apparatus for encoding video signals in which inter-encoded pictures and intra-encoded pictures are produced from an input video signal comprising a sequence of pictures, wherein each inter-encoded picture is produced by forming the difference between:

a) a transformed and quantized picture of the input signal; and b) a corresponding separately transformed and quantized predicted pictured derived from the input signal;

the quantizations applied to the transformed picture of the input signal and to the transformed predicted picture being the same.

According to another aspect of the present invention, there is provided a method of and apparatus for decoding video signals encoded according to the method of said one aspect, in which each inter-encoded picture is decoded by forming the sum of:

a) the transformed and quantized inter-encoded picture; and b) a separately transformed and quantized predicted picture; and dequantizing and inverse transforming the sum to produce the decoded picture;

the quantization applied to quantise the transformed predicted picture and to dequantise the said sum being similar to or the same as the quantization of the inter-encoded picture.

According to a further aspect of the invention there is provided a method of or apparatus for processing input video signals comprising: encoding the signals according to the method of said one aspect, to produce encoded signals; applying the encoded signals to a transmission channel, storage device or utilization means and receiving the encoded signals therefrom; and decoding the said received encoded signals according to the method of said another aspect to produce decoded picture signals.

The video signals are encoded so that their bit rate matches that of the transmission channel, storage device or utilization means, and then decoded when received therefrom. The quantization level may be changed during encoding to achieve the desired bit rate or may be held constant. The above-mentioned aspects of the invention provide reduced reconstruction error by forming inter-encoded pictures from separately transformed and quantized pictures which are effectively I-pictures and are in the transform domain, and subject to the same quantization.

According to yet another aspect of the invention, there is provided a method of or apparatus for processing a method of processing video signals in which at least some intra-encoded pictures are converted to inter-encoded pictures and then back to intra-encoded pictures, the quantization levels of the pictures which are converted and reconverted being maintained constant.

The yet another aspect of the invention provides reduced reconstruction error by maintaining the quantization level constant as I pictures are converted to P and/or B pictures and reconverted back to I.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
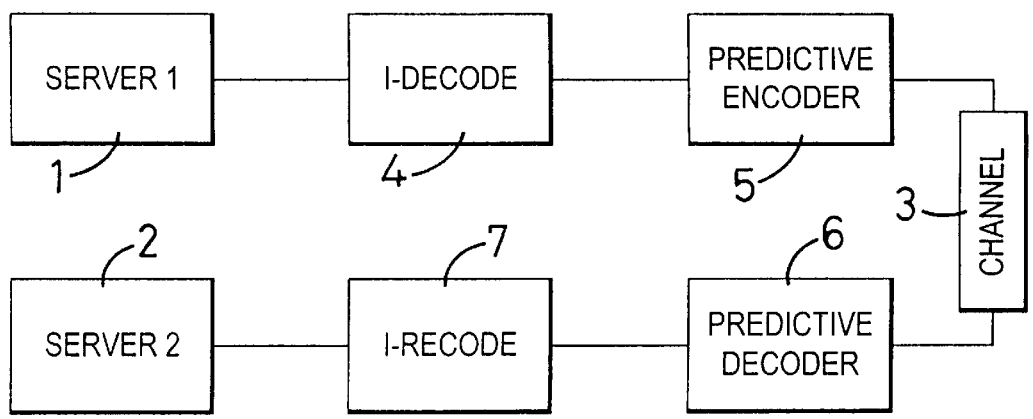
FIG. 1 is a schematic block diagram of a system, incorporating an embodiment of the invention, for transferring encoded image data from a first video server to a second video server via a channel.

Referring to FIG. 1, an illustrative system for transferring digitally encoded image data from a first video server 1 to a video second server 2 via a channel 3 is shown. The channel 3 may be a signal transmission system and/or include a signal storage device such as a video tape player/reproducer and/or be some other utilization means such as a computer.

In this example video servers 1 and 2 store the video encoded as I-frames only. That allows, for example, frame accurate editing of the encoded video.

The channel 3 has a bandwidth, or data rate, too small to allow the I-frames to be transferred from server 1 to server 2 at the normal video frame rate.

The system further comprises an I-decoder 4 which decodes the I-frames to the time domain or digital baseband, a predictive encoder 5 according to the invention which re-encodes the frames at a bit-rate which matches that of the channel 3, a corresponding predictive decoder which again decodes the frames to the time domain 6 and an I-encoder 7 which reconstructs the original I-frames for storage on the second server 2.

Figure 2:
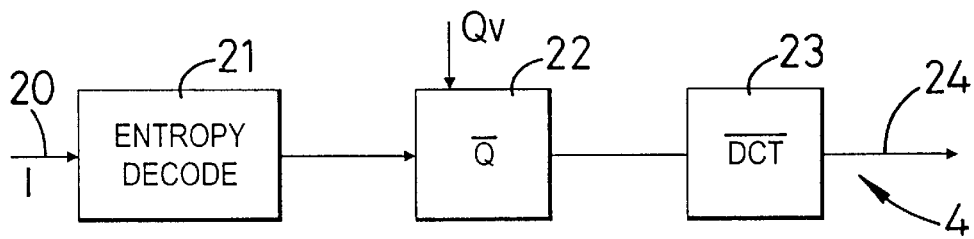
FIG. 2 is a schematic block diagram of an Intra-frame decoder, useful in the system of FIG. 1.

An example of an I-decoder 4 is shown in FIG. 2. It comprises an input 20 for received I-frames from the first server 1, an entropy decoder 1, a dequantizer 22, an inverse DCT transformer 23 and an output 24 at which a digital baseband video signal is produced.

Figure 3:
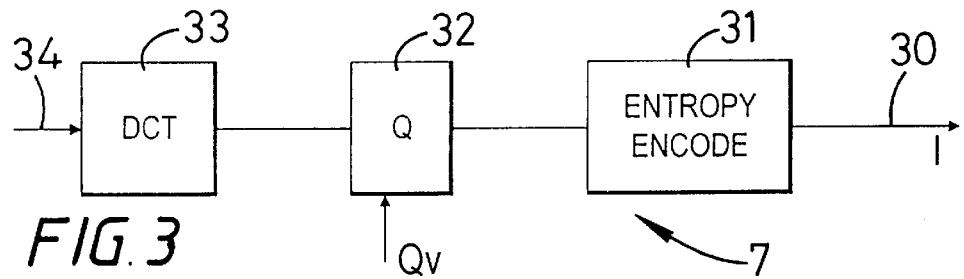
FIG. 3 is a schematic block diagram of an Intra-frame encoder useful in the system of FIG. 1.

The corresponding encoder 7 of FIG. 3 comprises an input 34 for receiving a digital baseband signal, a DCT transformer 33, a quantizer 32, an entropy encoder 31 and an output 30 at which I-frames are produced.

The operation of the decoder 4 and encoder 7 are conventional and will not be described here.

Figure 4:
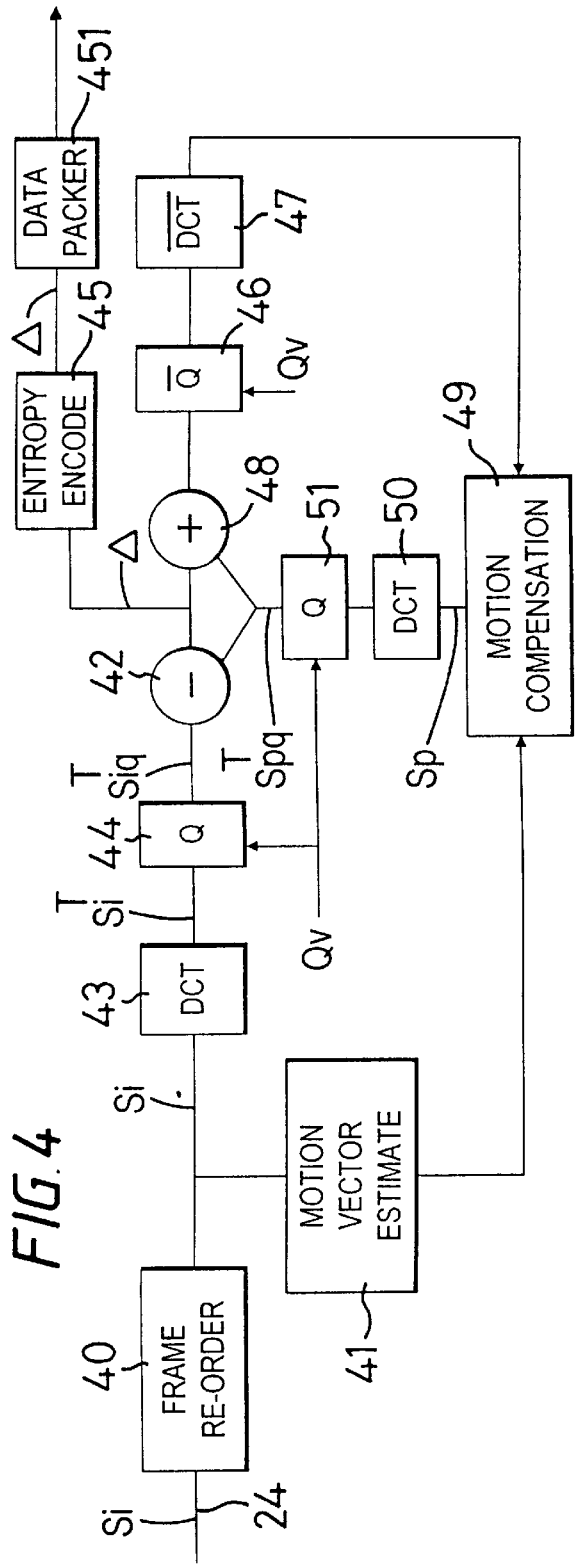
FIG. 4 is a schematic block diagram of an illustrative predictive encoder according to the present invention and useful in the system of FIG. 1.

FIG. 4 shows an illustrative predictive encoder according to the invention. Although the encoder does not comply with MPEG 2 much of its operation is the same or similar to that of an MPEG 2 encoder and it produces encoded signals capable of being decoded by an MPEG decoder. The encoder comprises an input 24 for receiving the decoded I-frames from the decoder 4, a frame reorderer 40 which reorders the frames, a motion vector estimator 41, a DCT transformer 43, a quantizer 44, a subtracter 42 in which the difference $\Delta = (S^T iq - S^T pq)$ between a current transformed and quantized frame $S^T iq$ and a predicted transformed and quantized frame $S^T pq$ is formed, and an entropy encoder 45 which entropy encodes the difference $\Delta$ to produce the desired encoded output signal. The predicted frame $S^T pq$ is produced by a decompression chain including an adder 48 which adds the predicted frame $S^T pq$ to the difference frame $\Delta$, a dequantizer 46, and an inverse DCT transformer 47, and by a motion vector compensator 49, a DCT transformer 50 and a quantizer 51. In accordance with this example of the present invention, the quantizers 44 and 51 quantise to the same values Qv.

Figure 8:
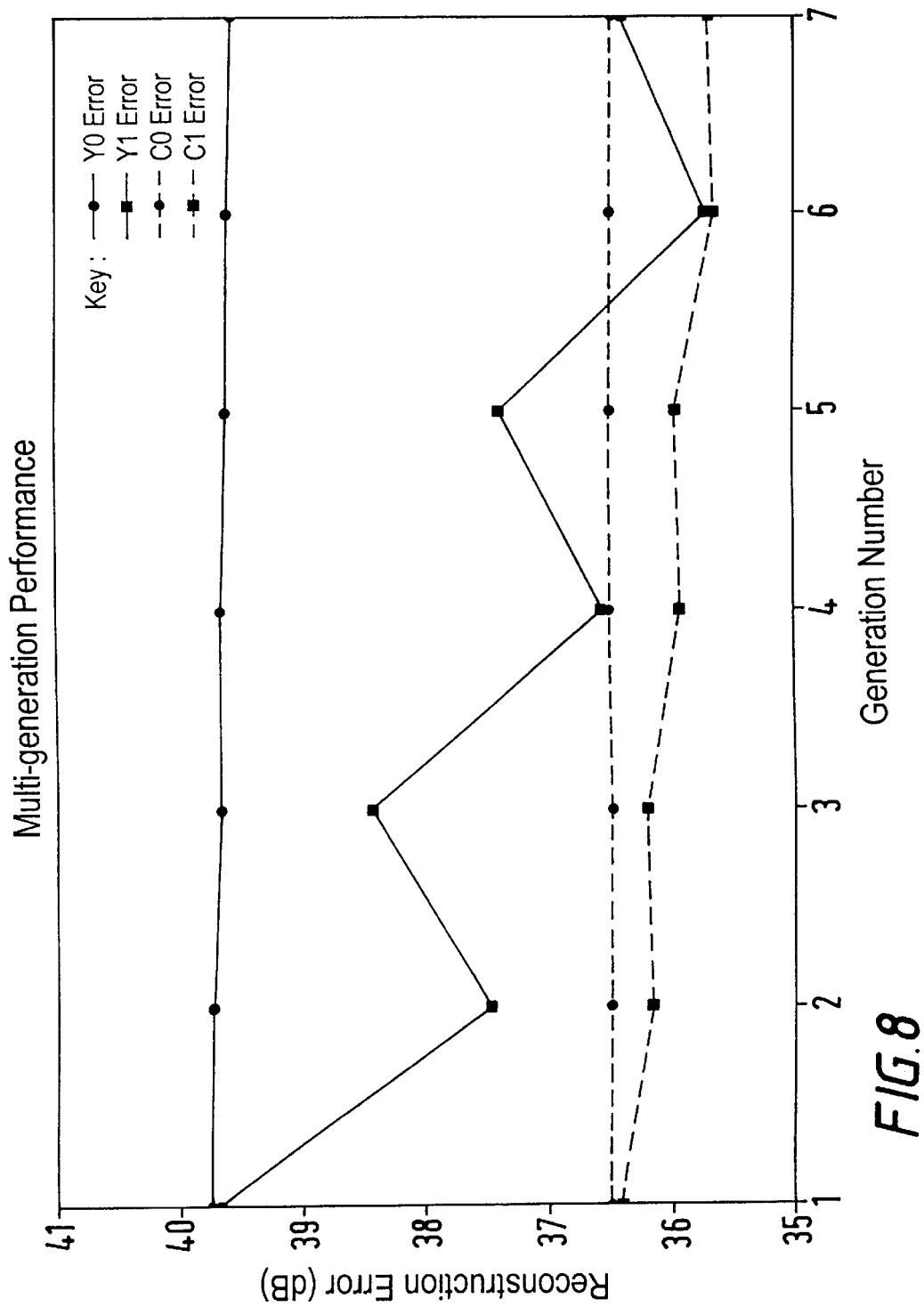
FIG. 8 is a graphical representation of the reconstruction error for MPEG encoding and decoding of the image sequence known as "flower garden"

It will be noted that unlike the MPEG encoder of FIG. 8 which forms the difference frame $\Delta$ in the time domain, the encoder of FIG. 4 forms the difference frame $\Delta$ in the transform domain. It will also be noted that unlike the MPEG encoder of FIG. 8, in which the dequantization and the inverse DCT transformer operate on the transformed difference frame $\Delta$, in the encoder of FIG. 4 the dequantizer 46 and inverse DCT transformer 47 operate on the transformed current frame $S^T iq$.

In operation, the decoded signal Si received at input 24 is reordered into a GOP comprising an I-frame and one or more P and/or B frames. The quantization values Qv applied to the frames, the GOP length, and the number of P and B frames in the GOP is chosen to achieve a bit rate which matches that of the channel 3. The bit rate may be selected to be less than that of the channel and additional bits may be inserted into the bit stream using the known technique of bit justification so that the bit rate matches that of the channel 3. The bit justification occurs in a conventional data packer 451 after the entropy encoder 45.

The quantization values Qv and the motion vectors Mv are included in syntax data included in the encoded bitstream in the same way as in MPEG 2 encoded signals.

Figure 5:
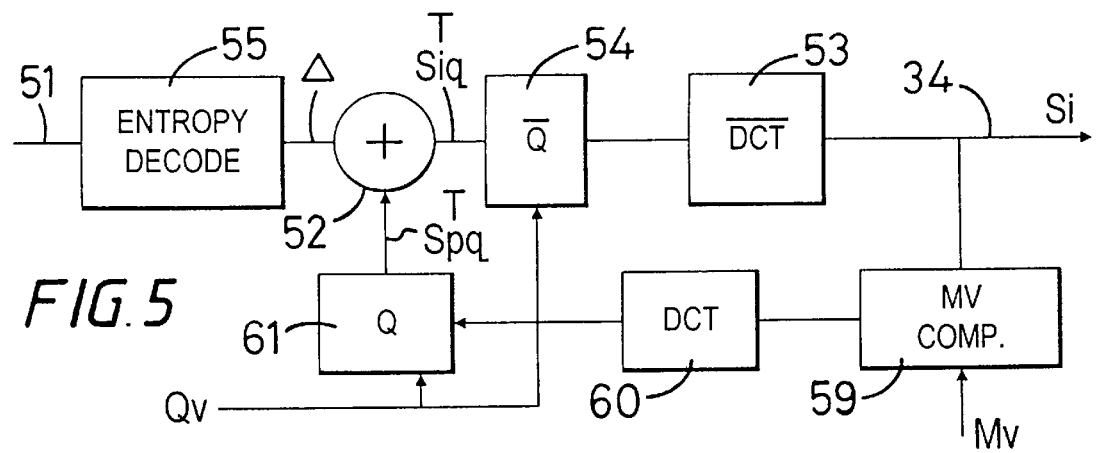
FIG. 5 is a schematic block diagram of an illustrative predictive decoder according to the present invention and useful in the system of FIG. 1.

The corresponding decoder of FIG. 5 comprises an input 51 for receiving the encoded signal $\Delta$ from encoder 5 via the channel 3, an entropy decoder 55, an adder 52, a dequantizer 54, an inverse DCT transformer 43, a motion vector compensator 59, a DCT transformer 60, a quantizer 61 and an output 34, at which the decoded signal Si is produced.

In operation, the input signal $\Delta$ is entropy decoded and added in adder 52 to a transformed and quantized prediction signal $S^T pq$ to produce a transformed and quantized signal $S^T iq$ which is dequantized in dequantizer 54 and inverse transformed in block 53 to produce the time domain decoded signal Si which is the desired output signal. The prediction signal $S^T pq$ is produced by applying motion vectors $M_v$ to the decoded signal Si in a motion compensator 59, and DCT transforming 60 and quantising 61 the result. The quantization values Qv applied to quantizer 61 and to the dequantizer 54 are the same, and are the values Qv applied to the transformed difference signal $\Delta$ in the encoder and transmitted to the decoder as syntax data.

Figure 10A:
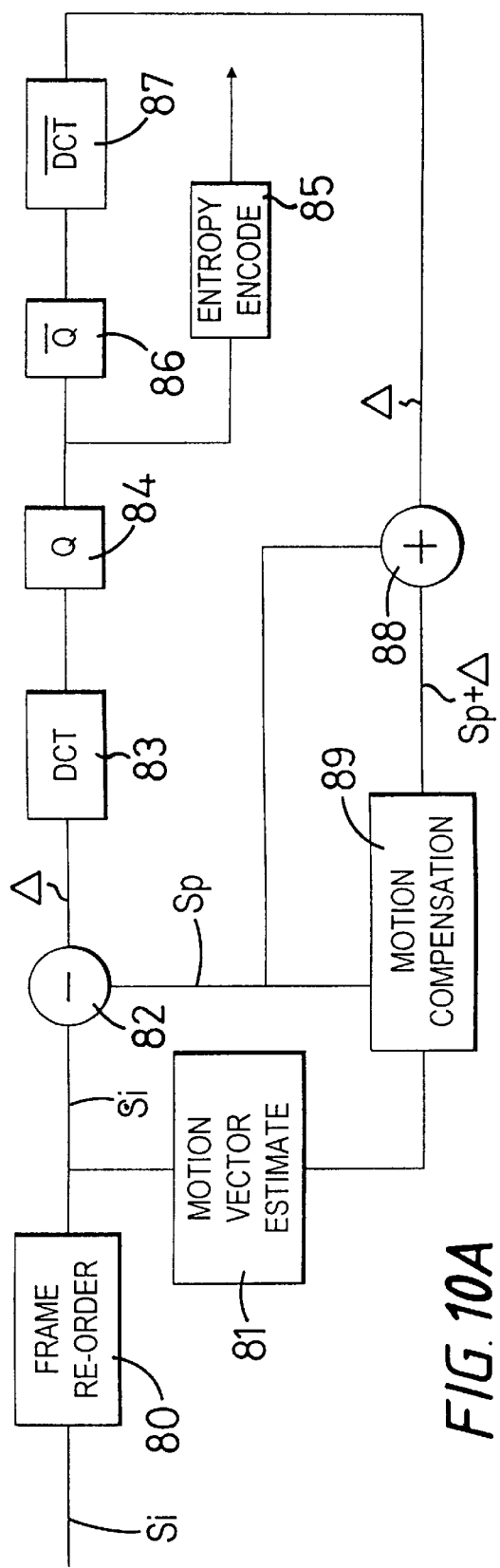
FIG. 10A is a schematic block diagram of a known MPEG 2 signal encoder.
Figure 10B:
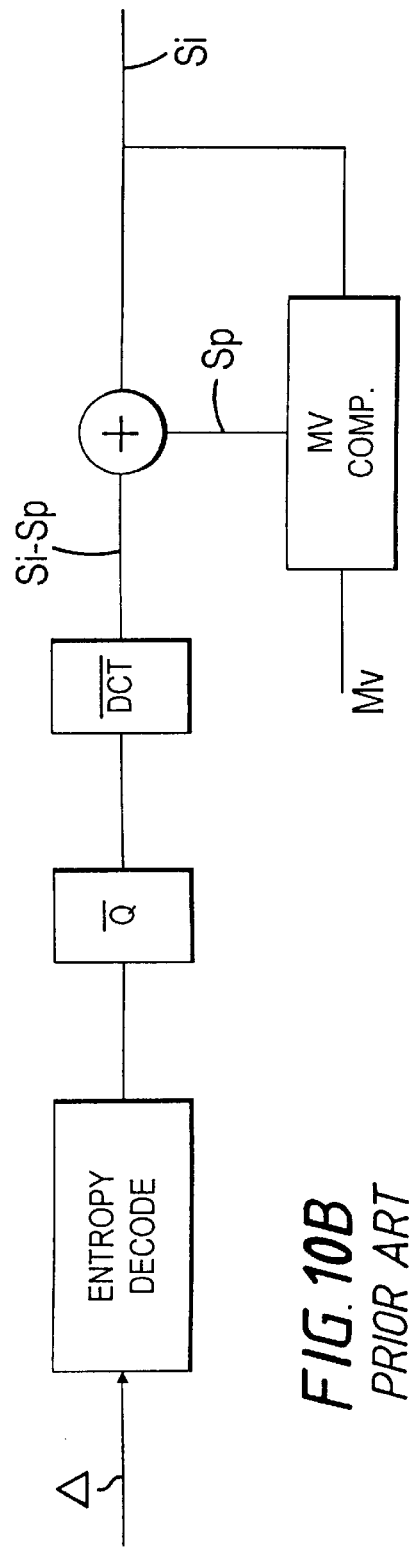
FIG. 10B is a schematic block diagram of a corresponding decoder.

It will be noted that unlike the MPEG decoder of FIG. 10B in which the prediction signal Sp is a time domain signal and is added to the dequantized time domain difference signal $\Delta$, in the decoder of FIG. 5 both the difference signal $\Delta$ and the prediction signal $S^T p$ are in the transform domain and are added together in the transform domain. It is this aspect which is the key component to ensuring good cascade performance because the signals in elements 43, 44, 45 and 47 are intra-frame coded.

Thus in the decoder of FIG. 5, the dequantization 54 operates on the transformed intra-encoded signal $S^T i$, not the transformed difference signal $\Delta$ as in the MPEG decoder of FIG. 8B.

Figure 6:
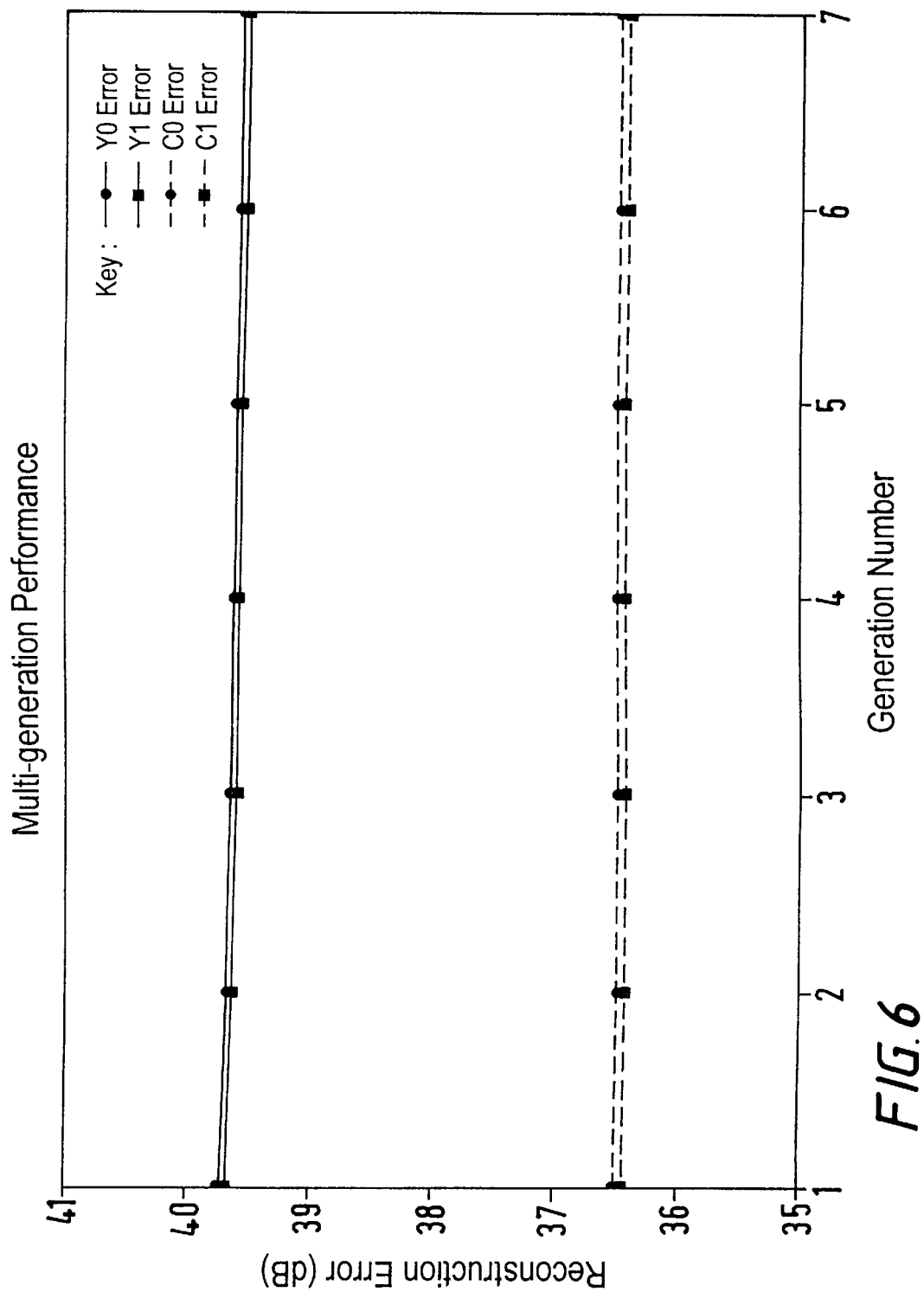
FIG. 6 is a graphical representation of reconstruction error using an encoder/decoder according to the present invention under a first set of conditions on an image sequence known as "flower garden"

The system of FIG. 1 using the encoder and decoder of FIGS. 4 and 5 may operate in two modes. In a first one of the modes the quantization levels of the original I frames are maintained constant throughout the encoding and decoding process. In that case as illustrated by FIG. 6, lines Yo and Co representing frames originally encoded as I-frames, suffer very little reconstruction error (~0dB) when decoded to the time domain and re-encoded to I over several generations, where one generation is for example one cycle of decode I to time domain and re-encode back to I. Lines $Y_1$ and $C_1$ show for the same mode that B-frames may be similarly decoded and re-encoded over several generations with substantially the same reconstruction error as I-frames.

In a second of the two modes, the quantization level of the signal produced by the encoder 5 is changed (as compared to that of the original I-frames supplied by the server 1) for example to produce a bit rate which matches that of the channel.

Figure 7:
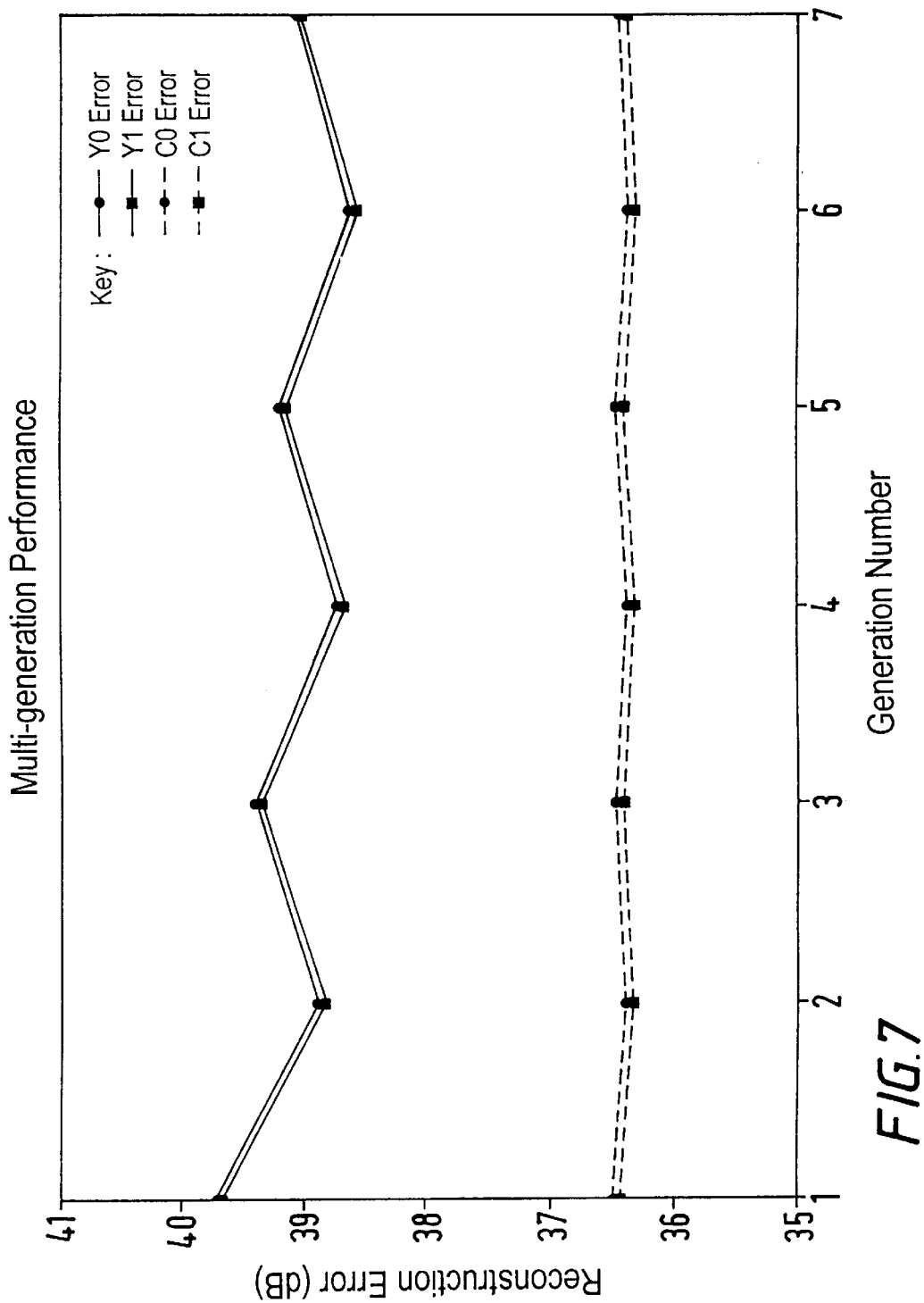
FIG. 7 is a graphical representation of reconstruction error using an encoder/decoder according to the present invention under a second set of conditions on the image sequence known as "flower garden"

FIG. 7 shows that when I and B frames are decoded and re-encoded over several generations, with an alternation of quantization levels in each generation, the reconstruction error is substantially the same for B and I frames and follows a trend to increased error with number of generations but with alternate (odd numbered) generations showing less error than intervening (even numbered) generations.

Comparison of FIG. 7 with FIG. 8 shows the error is much less than with the conventional MPEG encoding and decoding.

Figure 9:
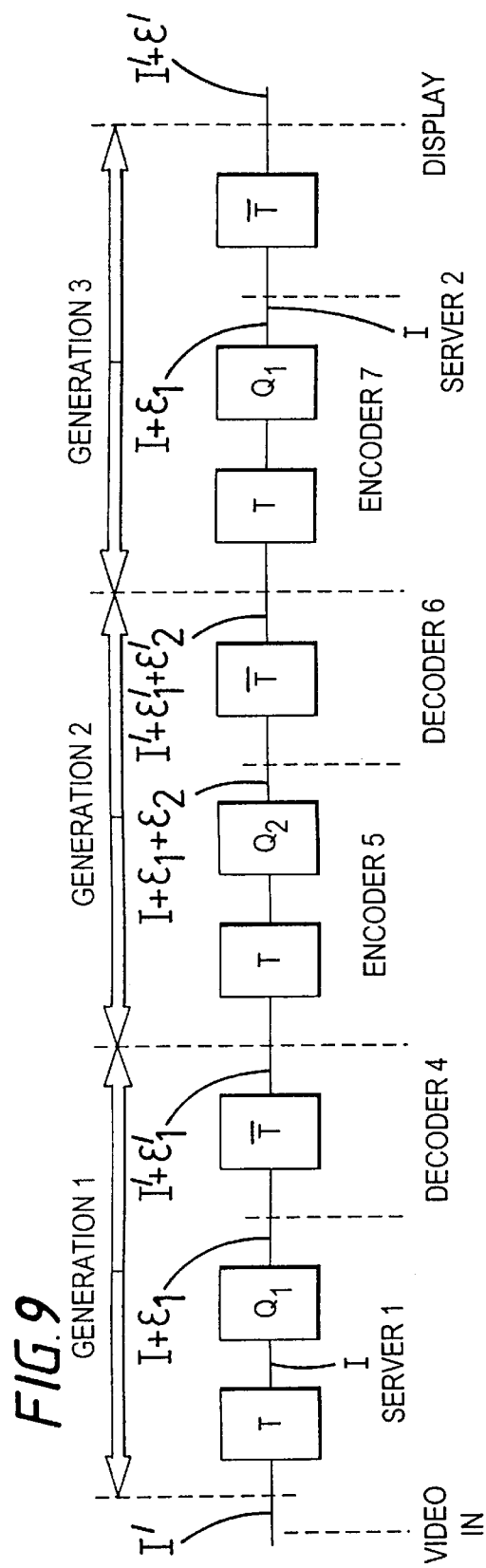
FIG. 9 is a diagram useful in explaining the results of FIG. 6, 7 and 8.

A postulation for the results of FIGS. 6, 7 and 8 is as follows referring to FIG. 9. FIG. 9 shows schematically repeated decoding and encoding of an I-frame omitting for simplicity motion vector processing. In FIG. 9, I and $\epsilon$ represent transformed data and I' and $\epsilon'$ represent decoded data. Whilst the following description relates FIG. 9 to FIG. 1, FIG. 9 is in fact a general description of several generations of encoding and decoding.

It will be appreciated that in the embodiments of FIGS. 4 and 5, the frames which are quantized are I-frames. The predicted frame $S^T p$ is an I-frame subject, in the encoder, to repeated encoding, decoding and encoding. The original I-frame which is converted to the signal $S^T i$ which is also an I-frame is subject to repeated encoding and decoding as it passes from Server 1 to Server 2.

At the first stage of coding, corresponding for example to processing of video before storing I-frames in server 1, each pixel of an I frame is subjected to a quantization process which introduces a quantization error of up to $\pm\epsilon/2$ and shown in FIG. 9 as $\epsilon_1$ and $\epsilon_2$ for the first two generations. The first generation corresponds for example to encoding to produce the intra-frames stored on server 1 and decoding in decoder 4 of FIG. 1. The second generation corresponds for example to encoding in encoder 5 and decoding in decoder 6 of FIG. 1. Provided the motion prediction values are consistent between generations and the DCT transform and the inverse DCT transform are sufficiently accurate to ensure near perfect reconstruction, then the errors input into the second generation quantizer are the same as those created in the first generation ($\epsilon_1$). The second quantizer creates a new set of errors $\epsilon_2$. The output of the quantizer of generation 2 is shown as the original source I added to the separate error components $\epsilon_1$ and $\epsilon_2$. The reason for keeping the errors as separate components becomes apparent in the third generation. The third generation corresponds for example to encoder 7 of FIG. 1 and subsequent decoding for display. At the end of the third generation, the output signal is almost identical to that provided as the source to the first generation. Therefore, given sufficient accuracy in the transforms and motion vector compensation process, the input to the third generation quantizer will be the transformed frame I of the first generation together with the added errors created by the first and second generations. Now the component $(I'+\epsilon'_1)$ is a rounded number which needs at least $+\epsilon/2$ additional signal to force a change of state in the quantizer output.

Referring to FIG. 6 since the quantizer level is kept constant over the generations in the first mode of operation, then the error $\epsilon_2$ created by the second generation quantizer is zero because the quantized levels $I+\epsilon_1$ fall exactly on the levels of the second quantizer (i.e. $\epsilon_2=\epsilon_3=0$). Similarly, any error created by the third generation is cancelled. Thus perfect reconstructions is assured following the first generation loss.

Referring to FIG. 7, the quantization values are changed in the second generation, corresponding to change in encoder 5 or quantization to match the bit rate of the channel 3. Thus, the quantizer in the second generation creates a new set of errors $\epsilon_2$ and the quantized signal is now $I+\epsilon_1+\epsilon_2$ and the reconstructed signal $I'+\epsilon_1'+\epsilon_2'$ indicates a reduced signal to noise ratio. In the third generation, corresponding to the decoding in the decoder 6 and re-encoding as I in encoder 7, the quantization is set to be the same as the quantization in the first generation. At the input to the third generation, the signal is $I'+\epsilon_1'+\epsilon_2'$. If the third generation quantizes the signal with the same quantization level as the first generation then the reconstructed signal out of the third generation might seem to be; $I_1'+\epsilon_1'+\epsilon_2'+\epsilon_3'$ but $\epsilon_3'=\epsilon_1'$ and since $I_1'+\epsilon_1$ is a quantized value, $\epsilon_3'$ is zero. Therefore the output from the third quantizer is $I_1/q_1+\epsilon_1/q_1+\epsilon_2/q_1$.

$I_1/q_1+\epsilon_1/q_1$ is an integer value. In many cases $\epsilon_2/q_1$ is zero because the error $\epsilon_2<\epsilon_1$. Therefore the output signal from the third codec is equal to the output of the first codec plus a small additional error $\epsilon_2$ when $\epsilon_2$ exceeds $\epsilon_1$. The effect is a recovery in S/N ratio at the third generation but with a slight loss over the first generation dependent on the input signal I' and the relationship between the quantizers of the first and second codecs.

In the present invention, the difference data $\Delta$ is produced by the subtracting the transformed and quantized data $S^T_{iq}-S^T_{pq}$ which are separately subject to the same quantization. In the conventional MPEG encoder the difference data is produced by subtracting the input and predicted data $S_i-S_p$ and then transforming and quantizing to form $(S_i-S_p)^T q$.

Forming $S^T_{iq}-S^T_{pq}$ slightly increases the entropy compared to forming $(S_i-S)^T_q$.

Figure 11:
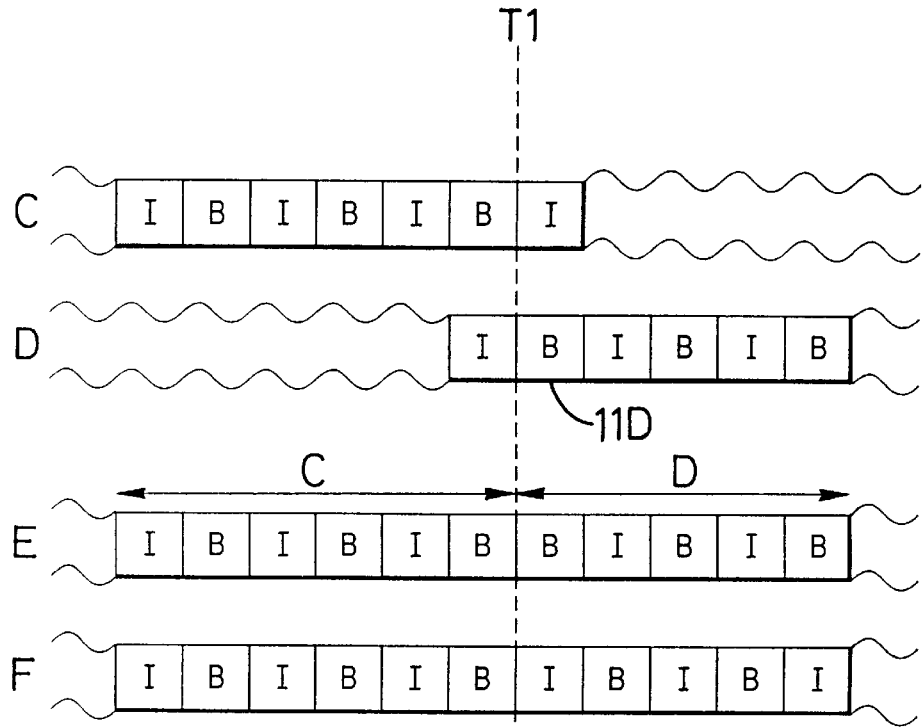
FIG. 11 is a schematic diagram of waveforms useful in explaining a further application of the present invention.
Figure 12:
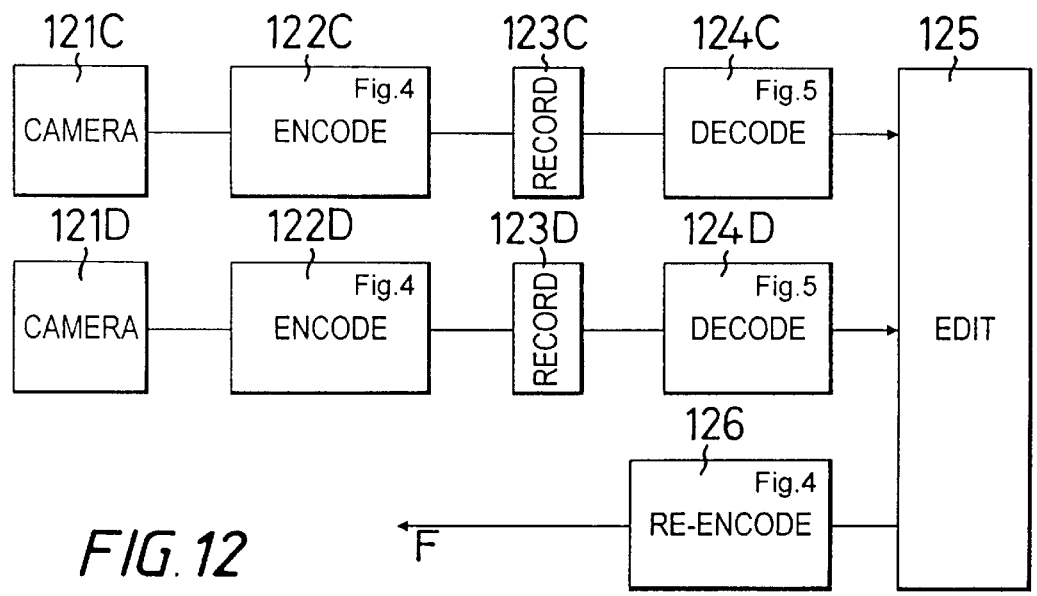
FIG. 12 is a block diagram of the further application.

A further application of the invention is shown in FIGS. 11 and 12.

Consider by way of example two encoded video bitstreams C and D each having a GOP of two consisting of an I-frame and a B-frame. Such a bit stream is used in the SONY SX (Trademark) video recorder. Assume for example it is desired to edit the bitstreams to the accuracy of one frame by a simple cut at boundary T1 to produce the bitstream E. At least the B-frame 11D is then isolated from its preceding reference frame(s). Furthermore the edited bitstream no longer has an uninterrupted sequence of I-B GOPs, there being adjacent B-frames at the cut T1.

Referring to FIG. 12 in accordance with this application of the invention, a digital bitstream produced by e.g. a camera 121 is encoded using an encoder 122 according to the invention as shown in FIG. 4 to produce an encoded bitstream having an I-B GOP of 2. Such a bitstream is for example recorded on tape as in an SX VTR 123 or otherwise transmitted or utilized before being presented for editing in an editor 125. In order to edit two such bitstreams C and D as shown in FIG. 11, each bitstream C and D is decoded to baseband using a decoder 124 as shown in FIG. 5 and edited at baseband (i.e.unencoded digital video). The edited baseband video is then re-encoded using an encoder 126 as shown in FIG. 4 to produce a bitstream F as shown in FIG. 11 having the correct sequence of I-B GOPs.

In accordance with one preferred version of this application of the invention, the quantization levels of the originally encoded frames are maintained constant throughout the decoding and re-encoding. In addition, the frames which are originally encoded as B have motion vectors associated with them. Those motion vectors are also retained (as concealment vectors) at least for those frames which were originally encoded as B and are subsequently re-encoded as B. This preferred version corresponds to the first mode described above.

This preferred version allows substantially loss-less decoding and re-encoding of I and B frames with conversion of I to B and of B to I.

Although FIGS. 11 and 12 illustrate editing such decoding and re-encoding may occur in other circumstances such as decoding and re-encoding for transmission through a network with subsequent decoding and re-encoding.

Whilst this version of the invention has been described with reference to an I-B GOP of 2, it may be applied to any length of GOP equal to or greater than 2 and furthermore, the GOP may include P and/or B frames. Any of the I, P and/or B frames may be decoded and re=encoded substantially losslessly as different ones of I, P and/or B.

Also, whilst the bitstream C was decoded to baseband, it could in principle be decoded to I-frames which would also allow frame accurate editing.

Whilst it is preferred to maintain the quantization levels constant as in the first mode the quantization levels may be changed between generations of encoding as in the second mode described above but with increased degradation over several generations.

Although the invention has been described by way of example with reference to DCT transforming, the principle of the invention is equally applicable to other transforms such as wavelet transform, a sub-band transform, and a pyramid transform all of which are known in the art.

Whilst the encoder of FIG. 4 does not comply with the MPEG 2 standard, it produces encoded signals which may be decoded by an MPEG decoder but without the benefit of the reduced reconstruction error in cascaded operations provided by the present invention.

The quantization applied to the frames in the present invention may be linear or non-linear.

Although the invention has been described with reference to frames, it may be applied to fields. Herein and in the claims, the term "pictures" is used generically for fields and frames.

When an inter-encoded picture is produced motion vectors are associated with it. These motion vectors may be conveyed in the bit stream as 'concealment' vectors in the syntax data to avoid recalculation on any subsequent decoding and encoding, and to improve subsequent inter-frame coding accuracy.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of encoding video signals in which inter-encoded pictures and intra-encoded pictures are produced from an input video signal comprising a sequence of pictures, wherein each inter-encoded picture is produced by:

transforming then quantizing a picture from said input video signal;

separately transforming then quantizing a corresponding predicted picture derived from said input video signal; the same quantizing being applied to said picture and said corresponding predicted picture; and forming said inter-encoded picture by taking the difference between the transformed and quantized picture and the transformed and quantized corresponding predicted picture.

2. The method according to claim 1, wherein said corresponding predicted picture is derived at least in part from a transformed and quantized picture from said input video signal preceding the picture to be inter-encoded.

3. The method according to claim 2 wherein said corresponding predicted picture is a bidirectionally interpolated picture.

4. A method of decoding video signals containing inter-encoded pictures formed as a function of the difference between a transformed and quantized picture derived from an input video signal, and a transformed and quantized predicted picture derived from said input video signal, in which a decoded picture is produced from each inter-encoded picture by:

transforming then quantizing said inter-encoded picture;

separately transforming then quantizing said corresponding predicted picture; the same quantizing being applied to said inter-encoded picture and said corresponding predicted picture; and forming said decoded picture by dequantizing and inverse transforming the sum of the transformed and quantized inter-encoded picture and the transformed and quantized corresponding predicted picture.

5. The method according to claim 4, wherein said corresponding predicted picture derived from said input video signal is produced at least in part from a preceding decoded picture.

6. A method according to claim 5, wherein the predicted picture is a bidirectionally interpolated picture.

7. A method according to claim 1, wherein the pictures are transformed using a Discrete Cosine Transform.

8. A method according to claim 1, wherein the pictures are transformed using a wavelet transform, a sub-band transform or a pyramid transform.

9. A method of processing an input video signal comprising:

encoding said input video signal according to the method of claim 1, to produce an encoded signal;

applying said encoded signal to a transmission channel, storage device or utilization means and receiving said encoded signal therefrom; and decoding the received encoded signal to produce a decoded picture signal.

10. A method according to claim 9, wherein the input video signal is produced by dequantization and inverse transformation of a transformed and quantized intra-encoded signal.

11. A method according to claim 9, wherein the decoded picture signal is re-encoded as a transformed and quantized intra-encoded picture signal.

12. A method according to claim 10, wherein the quantization of the encoded signals which are decoded and encoded is maintained constant.

13. A method of processing an input video signal comprising the steps of:

encoding the input video signal according to the method of claim 1, to produce an encoded signal;

applying said encoded signal to a transmission channel, storage device, or utilization means and recovering the signal therefrom;

decoding said encoded signal to produce a decoded signal;

processing said decoded signal; and re-encoding the processed decoded signal according to said encoding step.

14. A method according to claim 13, wherein the processing of the decoded signal comprises editing.

15. A method according to claim 13, wherein the quantization of the encoded signals which are decoded and re-encoded is maintained constant.

16. A method of processing video signals in which at least some intra-encoded pictures are converted to inter-encoded pictures using the method of claim 1, and then back to intra-encoded pictures, the quantization levels of the pictures which are converted and reconverted being maintained constant.

17. Apparatus for encoding video signals, in which apparatus inter-encoded pictures are produced from an input signal comprising a sequence of pictures, the apparatus including:

means for transforming and quantizing the pictures of the input signal;

means for deriving separately transformed and quantized corresponding predicted pictures from the input signal; and means for forming inter-encoded pictures by forming the difference between the transformed and quantized predicted pictures and the transformed and quantized pictures of the input signal; the same quantizing being applied to each said transformed picture of the input signal and to the corresponding transformed predicted picture.

18. Apparatus according to claim 17, comprising:

a transform unit for transforming the pictures of the input signal, a quantizer for quantizing the transformed pictures, means for dequantizing the quantized and transformed input pictures, means for inverse transforming the dequantized pictures, means for forming predicted pictures from the inverse transformed and dequantized pictures, means for transforming the predicted pictures, means for quantizing the transformed predicted pictures, a subtracter for forming the difference between the transformed and quantized input pictures and the transformed and quantized predicted pictures, and an entropy encoder for encoding the differences.

19. Apparatus according to claim 18, further comprising an adder for adding the transformed and quantized predicted pictures to the differences, to reform the input pictures, the dequantizing means dequantizing the reformed input pictures.

20. Apparatus according to claim 18, wherein the predicted picture forming means includes a motion compensator.

21. Apparatus according to claim 17, wherein the transforming means performs a Discrete Cosine Transform.

22. Apparatus according to claim 17, wherein the transforming means performs a wavelet transform, a sub-band transform or a pyramid transform.

23. Apparatus for decoding video signals encoded by the apparatus of claim 17, the apparatus including:

means for forming the sums of transformed and quantized inter-encoded pictures received by the apparatus and corresponding separately transformed and quantized predicted pictures;

means for dequantizing and inverse transforming the sums to produce decoded pictures; and means for forming quantized and transformed predicted pictures for application to the sum forming means, the same quantization being applied to each predicted picture and to the corresponding sum.

24. Apparatus according to claim 23, wherein the means for forming the predicted pictures includes a motion compensator coupled to receive the decoded pictures.

25. A system for processing video signals comprising at least intra-encoded pictures using the apparatus of claim 17, the system further comprising:

means for converting intra-encoded pictures to inter-encoded pictures including at least quantizing said intra-encoded pictures; and means for re-converting inter-encoded pictures back to intra-encoded pictures including at least quantizing said inter-encoded pictures, the quantization of the intra-encoded pictures which are converted to inter-encoded pictures and back to intra-encoded pictures being maintained constant.

26. A system for processing input video signals comprising:

encoding apparatus to produce encoded pictures, including:

means for transforming and quantizing the pictures of the input signal, means for deriving separately transformed and quantized corresponding predicted pictures from the input signal, and means for forming inter-encoded pictures by forming the difference between the transformed and quantized predicted pictures and the transformed and quantized pictures of the input signal, the same quantizing being applied to each said transformed picture of the input signal and to the corresponding transformed predicted picture:

a transmission channel, storage device or utilization means coupled to receive the encoded pictures; and a decoding apparatus coupled to receive the encoded pictures from the transmission channel, storage device, or utilization means for decoding the encoded pictures to produce decoded picture signals; said decoding apparatus including:

means for forming the sums of transformed and quantized inter-encoded pictures received by the apparatus and corresponding separately transformed and quantized predicted pictures;

means for dequantizing and inverse transforming the sums to produce decoded pictures; and means for forming quantized and transformed predicted pictures for application to the sum forming means, the same quantization being applied to each predicted picture and to the corresponding sum.

27. A system according to claim 26, further comprising means for decoding by dequantization and inverse transformation, intra-encoded pictures to produce the input video signals.

28. A system according to claim 27, further comprising means for re-encoding, by transformation and quantization, the decoded picture signals as intra-encoded pictures.

29. A system according to claim 27, wherein the quantizations of the inter-encoded pictures which is decoded and re-encoded as intra-encoded pictures are maintained constant.

30. Apparatus for processing an input video signal comprising:

means for encoding the input video signal to produce an encoded signal including:

means for transforming and quantizing the pictures of the input signal, means for deriving separately transformed and quantized corresponding predicted pictures from the input signal, and means for forming inter-encoded pictures by forming the difference between the transformed and quantized predicted pictures and the transformed and quantized pictures of the input signal, the same quantizing being applied to each said transformed picture of the input signal and to the corresponding transformed predicted picture;

optionally a transmission channel, storage device, or utilization means to which the encoded signal is applied and recovered therefrom;

means for decoding the encoded signal to produce the decoded signal, including:

means for forming the sums of transformed and quantized inter-encoded pictures received by the apparatus and corresponding separately transformed and quantized predicted pictures, means for dequantizing and inverse transforming the sums to produce decoded pictures, and means for forming quantized and transformed predicted pictures for application to the sum forming means, the same quantization being applied to each predicted picture and to the corresponding sum;
means for processing the decoded signal; and
means for re-encoding the processed signal according to the encoding means discussed herein.

31. Apparatus according to claim 30, wherein the means for processing the decoded signal comprises editing means.

32. A method according to claim 30, wherein the quantization of the encoded signals which are decoded and re-encoded is maintained constant.

* * * * *